United States Patent

[11] 3,609,685

[72] Inventor Edward Samuel Deutsch
London, England
[21] Appl. No. 672,598
[22] Filed Oct. 3, 1967
[45] Patented Sept. 28, 1971
[73] Assignee Her Majesty's Postmaster General
London, England
[32] Priority Oct. 7, 1966
[33] Great Britain
[31] 45045/66

[54] CHARACTER RECOGNITION BY LINEAR TRAVERSE
3 Claims, 19 Drawing Figs.

[52] U.S. Cl. .......... 340/146.3AE
[51] Int. Cl. .......... G06k 9/10
[50] Field of Search .......... 340/146.3

[56] References Cited
UNITED STATES PATENTS

| | | | |
|---|---|---|---|
| 3,245,036 | 4/1966 | Grottrup .......... | 340/146.3 |
| 3,297,993 | 1/1967 | Clapper .......... | 340/146.3 |
| 3,339,179 | 8/1967 | Shelton, Jr. et al. .......... | 340/146.3 |

OTHER REFERENCES

Unger, Proceedings of the Ire, " Pattern Detection and Recognition," October, 1959. pp. 1737- 1751.

*Primary Examiner*—Maynard R. Wilbur
*Assistant Examiner*—Leo H. Boudreau
*Attorney*—Hall & Houghton

ABSTRACT: Techniques to character recognition in which the shape of the character is stored in a matrix of storage cells which is then examined electrically to correct deficiencies not inherent in the character and to "thin" the stored shape to a required extent. The store shape is then examined again and converted to a characteristic combination of numbered direction vectors and junction points which is compared with standard combinations in order to recognize the character.

EDWARD S. DEUTSCH,
INVENTOR
BY [signature]
ATTORNEY

EDWARD S. DEUTSCH,
INVENTOR

BY Hall & Houghton
ATTORNEY

EDWARD S. DEUTSCH,
INVENTOR
BY [signature]
ATTORNEY

EDWARD S. DEUTSCH
INVENTOR
BY Hall & Houghton
ATTORNEY

EDWARD S. DEUTSCH,
INVENTOR

BY Hall & Houghton
ATTORNEY

EDWARD S. DEUTSCH,
INVENTOR

BY [signature]
ATTORNEY

EDWARD S. DEUTSCH,
INVENTOR
BY Hall & Houghton
ATTORNEY

EDWARD S. DEUTSCH,
INVENTOR

BY [signature]

ATTORNEY

EDWARD S. DEUTSCH,
INVENTOR
BY Hall & Houghton
ATTORNEY

EDWARD S DEUTSCH
INVENTOR

BY Hall & Houghton
ATTORNEY

| SUBCHAIN VECTOR VALUE | INTERCHANGABLE AND COMBINES WITH SUBCHAIN VECTOR VALUE |
|---|---|
| 1 | 2 |
| 2 | 3 |
| 3 | 4 |
| 4 | 5 |
| 5 | 6 |
| 6 | 7 |
| 7 | 8 |
| 8 | 1 |

FIG. 17.

| CASE No | SUBCHAIN COMPRISING VECTOR VALUE | FOLLOWED BY SUBCHAIN COMPRISING VECTOR VALUE | CASE INTERCHANGABLE WITH CASE |
|---|---|---|---|
| 1 | 1 | 2 | 10 |
| 2 | 2 | 3 | 11 |
| 3 | 3 | 4 | 12 |
| 4 | 4 | 5 | 13 |
| 5 | 5 | 6 | 14 |
| 6 | 6 | 7 | 15 |
| 7 | 7 | 8 | 16 |
| 8 | 8 | 1 | 9 |
| 9 | 1 | 8 | 8 |
| 10 | 2 | 1 | 1 |
| 11 | 3 | 2 | 2 |
| 12 | 4 | 3 | 3 |
| 13 | 5 | 4 | 4 |
| 14 | 6 | 5 | 5 |
| 15 | 7 | 6 | 6 |
| 16 | 8 | 7 | 7 |

FIG. 18.

EDWARD S. DEUTSCH,
INVENTOR

BY Hall & Houghton
ATTORNEY

| SUBCHAIN COMBINATIONS OF ANGLE $\phi$ | READING DIRECTIONS FOR $\phi$ AND $\theta$ RELATIONS | | | n |
|---|---|---|---|---|
| | $\frac{\pi}{2}(1+n) > \phi > \frac{\pi}{2}(1+n) - \theta$ | $\frac{\pi n}{2} + \theta > \phi > n\frac{\pi}{2}$ | NEITHER | |
| 1 ⇄ 2 | — | 1 | 2 | 0 |
| 2 ⇄ 3 | 3 | — | 2 | |
| 3 ⇄ 4 | — | 3 | 4 | 1 |
| 4 ⇄ 5 | 5 | — | 4 | |
| 5 ⇄ 6 | — | 5 | 6 | 2 |
| 6 ⇄ 7 | 7 | — | 6 | |
| 7 ⇄ 8 | — | 7 | 8 | 3 |
| 8 ⇄ 1 | 1 | — | 8 | |

FIG. 19.

EDWARD S. DEVIS...
INVENTOR

BY Hall & Houghton
ATTORNEY

CHARACTER RECOGNITION BY LINEAR TRAVERSE

BACKGROUND OF THE INVENTION

This invention relates to character recognition techniques and has particular reference to techniques for use in the processing of characters of alphanumeric form prior to recognition.

It is important that a practical character recognition machine be insensitive to imperfections in shape, to gaps and discontinuities not inherent in the shape of the character, to variations in line thickness, to orientation, and the presence of other irrelevant information.

It has been proposed to scan a character to be recognized by a beam of light or other suitable radiation and to store the information so obtained in a matrix of storage cells each of which can have a condition binary 0 or binary 1 depending upon whether any part of the character lies in a position corresponding to the cell. In cases where the contrast between the character and its background is good no difficulty is experienced in assigning a condition to a cell, but in cases of less good contrast it may be necessary for a preliminary "-weighting-up" procedure (based on the states of the surrounding cells) to be undergone before a decision as to the cell condition can be reached.

The matrix of cells is then examined and the information therein processed before the character represented by the information can be recognized.

SUMMARY OF THE INVENTION

The present invention is concerned with processing techniques and is based on the representation of the character as a simple code consisting of a series of numbers. The character, in alphanumeric form, is scanned and the information stored in a first rectangular matrix of storage cells. Those cells are then examined by a process in which gaps and irregularities not inherent in the shape of the character are filled in and redundant information is ignored, the information resulting from the examination being transferred cell-by-cell to a second rectangular matrix of storage cells and deleted from the first matrix. The information in the second matrix may then be used to drive character recognition apparatus, or may undergo the process known as "thinning" and then used to drive that apparatus.

Thinning has the object of eliminating redundant information thereby economizing on the storage capacity required to store the information.

Certain redundant information is eliminated by reexamining a character after processing by comparing angular features of the character with predetermined angular directions and recording the features using those predetermined directions.

A predetermined number of the consecutive direction numbers is examined to determine the angular direction of the feature and if this direction is not one of the predetermined directions but lies within a predetermined range of one of the latter directions, the feature is recoded as that one direction.

The recoded chain representing a character may then be compared with each of a number of chains each representing a possible variation of the appearance of the chain in order to recognize the recoded chain.

DESCRIPTION OF PREFERRED EMBODIMENTS

Figure 1:
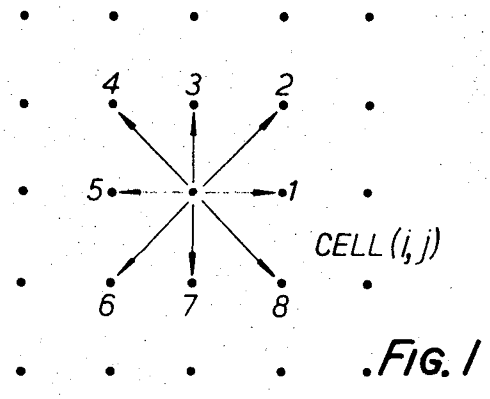
FIGS. 1, 2 and 3 are explanatory diagrams of coding techniques.

Each character to be recognized is considered to be laid over a rectangular matrix of points of which any one—for example that represented by the coordination $(i, j)$—has up to a maximum of eight nearest neighbors. If movement from any one point can take place only to one of those nearest points and so on, all point-to-point movement can be registered as a series of direction numbers. Fig. 1 illustrates part of a typical rectangular array, the direction numbers being the digits 1–8 as shown.

Figure 2:
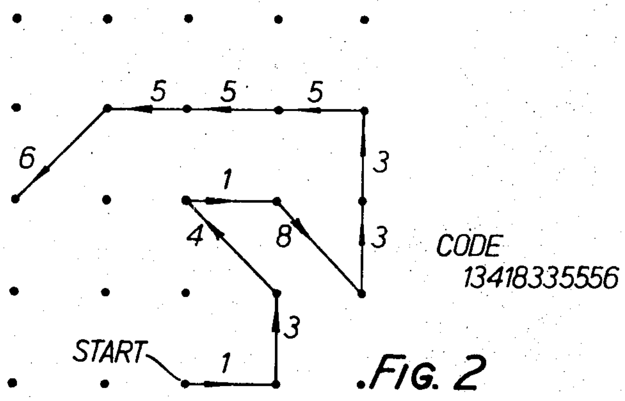

Fig. 2 illustrates one way in which a particular pattern might be coded as a sequence of the direction numbers starting at the point shown.

It is evident that the location on the matrix of a given pattern is immaterial and, provided the same starting point is used, the pattern can be reproduced anywhere on the matrix if the latter is large enough. Rotation of any pattern thus encoded by N times $\pi/4$ (N being integral) in an anticlockwise direction can be effected by adding N to each direction number on a modulo 8 basis (i.e. by replacing any direction number exceeding eight by the excess of the number over eight).

Figure 3:
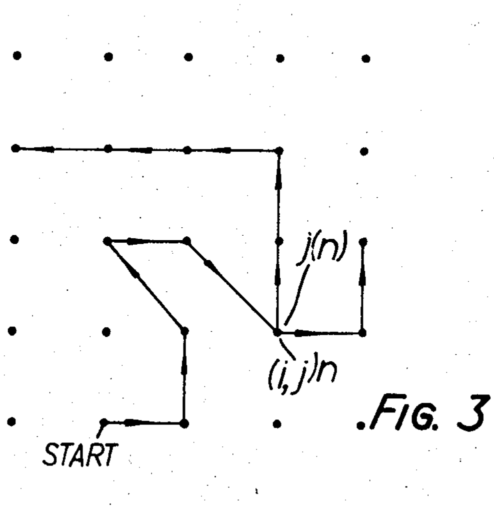

In practice, many characters are not of single path form and have junctions at which two or more paths meet. An example is given in Fig. 3 which shows part of the pattern of Fig. 2 with an extra branch added at point $(i, j)$. According to one feature of the present invention, and except as indicated below, such points are assigned a junction point (or node) serial number of coordinates $(i, j)$.

The procedure for coding a multipath character incorporates the following rules:

1. Assign the junction or node number, value $n$ and store coordinates $(i, j)$ $(n)$ as above. Enter the junction number as $J(n)$ in the chain of direction numbers. (This is for use in the recognition procedure, the J( ) serves to distinguish a node number from a direction number).
2. (*a*) Proceed along the same direction of travel as before, if possible, or, (*b*) proceed in the direction of lowest direction number if not.
3. On arrival at the end of a branch return to the uncompleted node point of lowest value $n$, reenter $J(n)$ in the chain and continue as in 2(*b*).
4. Treat a starting point having more than one branch leaving it as a junction point, i.e. register the junction node J(1) at the beginning of the chain and proceed as in 2(*b*).

The character stored in the second matrix is further processed by "thinning" which takes place after the examination process mentioned above. It will be apparent that the "thickness" of the character and the presence of features such as serits and curlicues do not contribute useful information and in the further processing, "thinning" takes place and unnecessary features such as serits and curlicues are eliminated.

The information in the second matrix is transferred back to the first matrix (now empty) and is subjected to a reexamination to effect "thinning" etc. The information in the second matrix is deleted and the latter then becomes available to receive fresh information relating to the reexamined character.

By way of example only, processing techniques embodying the invention will now be described in greater detail.

The techniques will be described with reference to Fig. 4 which shows diagrammatically the processing of the letter B. The character letter B indicated by reference numeral 1 and stored in the first matrix has numerous imperfections, as for example at 2, and redundancies, as at 3, in its feature representation and it is the object of the smoothing procedure to eliminate them. The letter B indicated at 4 and stored in the second matrix shows the results of such smoothing procedure. There are no gaps or irregularities and the thickness of the letter is substantially constant. The steps of the procedure are summarized in the flow diagram shown in Fig. 5. The character is first scanned and stored by any suitable technique in a first rectangular matrix of storage cells of a computer.

The contents of the first matrix are then examined. The overall height and width of the character B in terms of row and column occupancy is determined, and the character may then be imagined to be constrained within a rectangle of this height and width: thus defining the search area. The size of this constraining rectangle will be used subsequently, by means of a parameter D dependent upon it, in deciding whether an apparent feature of the character is real or not.

The value of D is the minimum length constituting a branch of a character and choice of an appropriate value enables groups of cells forming mere line thicknesses of the character to be distinguished from those forming features of the character.

The computer will now, in effect, examine in turn each storage cell in the search area starting from the uppermost row in the constraining rectangle and moving to the right searching for a cell having a condition equal to binary 1. Having found such a cell of coordinates $(i, j)$ a search for the existence of branches in all the eight directions mentioned above and of minimum length D is commenced. The next element of coordinates $(i, j\ 1)$ is examined should there be no such branch.

The value of D selected ensures that the computer rather than "locking" itself on to a spurious small feature of print and offering that as a character to be recognized, locks itself on to the character proper. Once the computer has attached itself to the character, the number of paths or branches of the character at the starting point is memorized together with the starting point coordinates.

The computer moves along one of the branches cell-by-cell transferring the character just investigated to a second rectangular matrix of storage cells and erasing the storage in the first matrix. This prevents continuous traverse along a closed path but causes no loss in information as the second matrix is also consulted throughout the examination. Prior to any move in the direction of travel being executed, the condition of the next cell—binary 1 or binary 0—is determined. In the case of the former, a move is executed and the number or branches, if any, of minimum length D leaving the new cell is registered. Gaps to branches alongside are joined and registered as taking part in forming the junction or node point. Three parameters are involved in registering a node point: the node number $n$, the number of branches at that node, $x(n)$, $x(n) \geq 2$), and the node coordinates $(i, j)$ $(n)$.

The cells may have the condition binary 0 because of irregularities in the thickness of the print, gaps, either along the direction of travel or in the formation of a junction of features further on, or because of a change in the contour of the feature or finally, in the absence of any of these causes, the end of a branch may have been reached. The computer examines these possibilities.

In the process of filling in gaps all cells participating have their conditions changed from binary 0 to binary 1 and the travel procedure is continued along these cells. In this manner a "bootstrap" operation is executed whereby the computer lays its own tracks. In all cases, the allowable extent of hunting for a gap is a function of the parameter D.

Irregularities in line thickness are overcome by consulting neighboring cells stored in both matrices and which form the line thickness, but, should the end of a branch have been reached, a traverse along a new branch leaving either the present or the previous cell is attempted. In the absence of such a branch the travel procedure recommences from the junction point of lowest node value $n$, and the number of branches at that node, $x(n)$ is reduced by 1. This process continues until the value of $x(n)$ for maximum $n$ is zero at which point the procedure is terminated.

Figure 4:
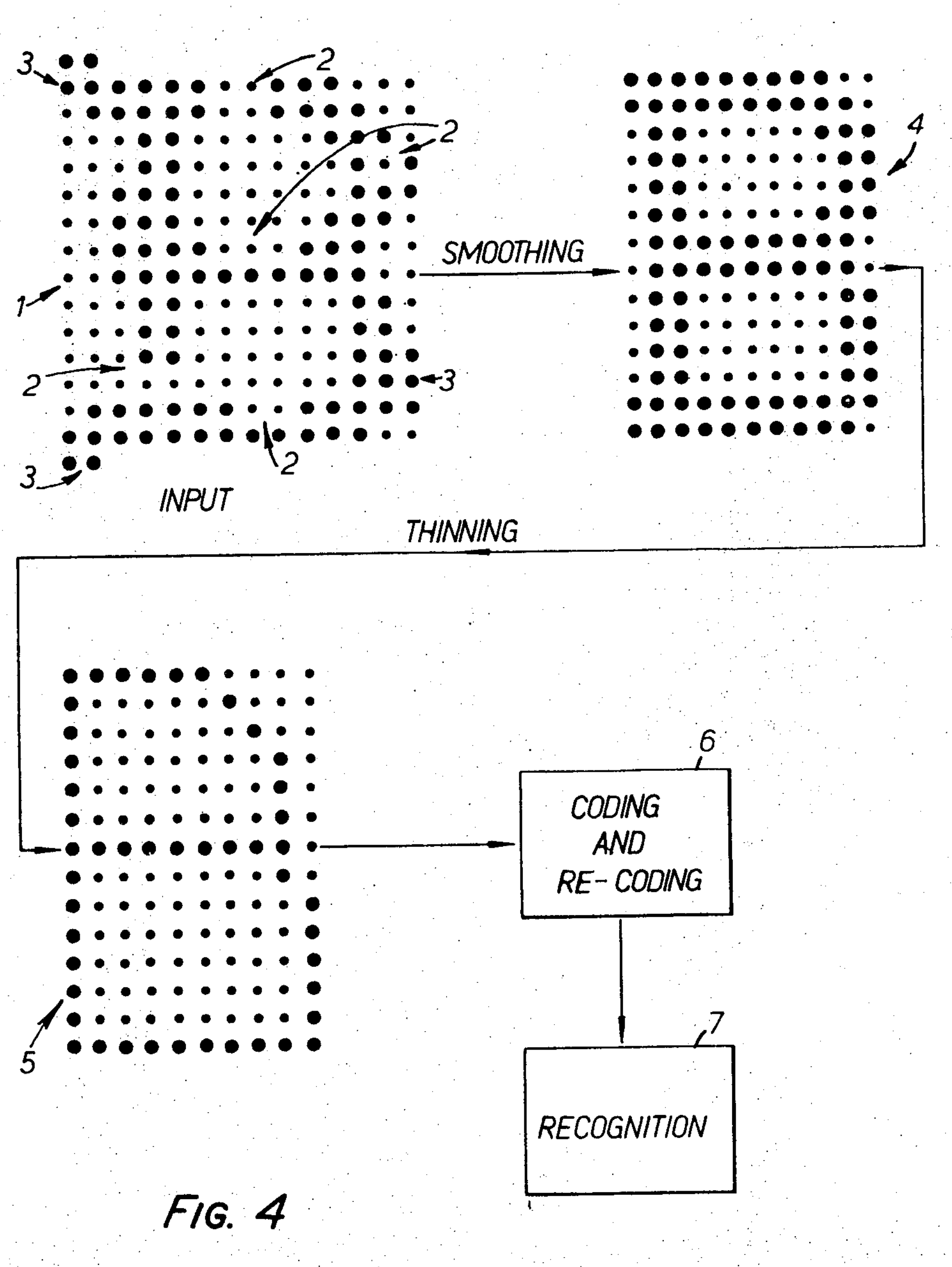
FIG. 4 is a diagrammatic representation of a character-processing technique.
Figure 5:
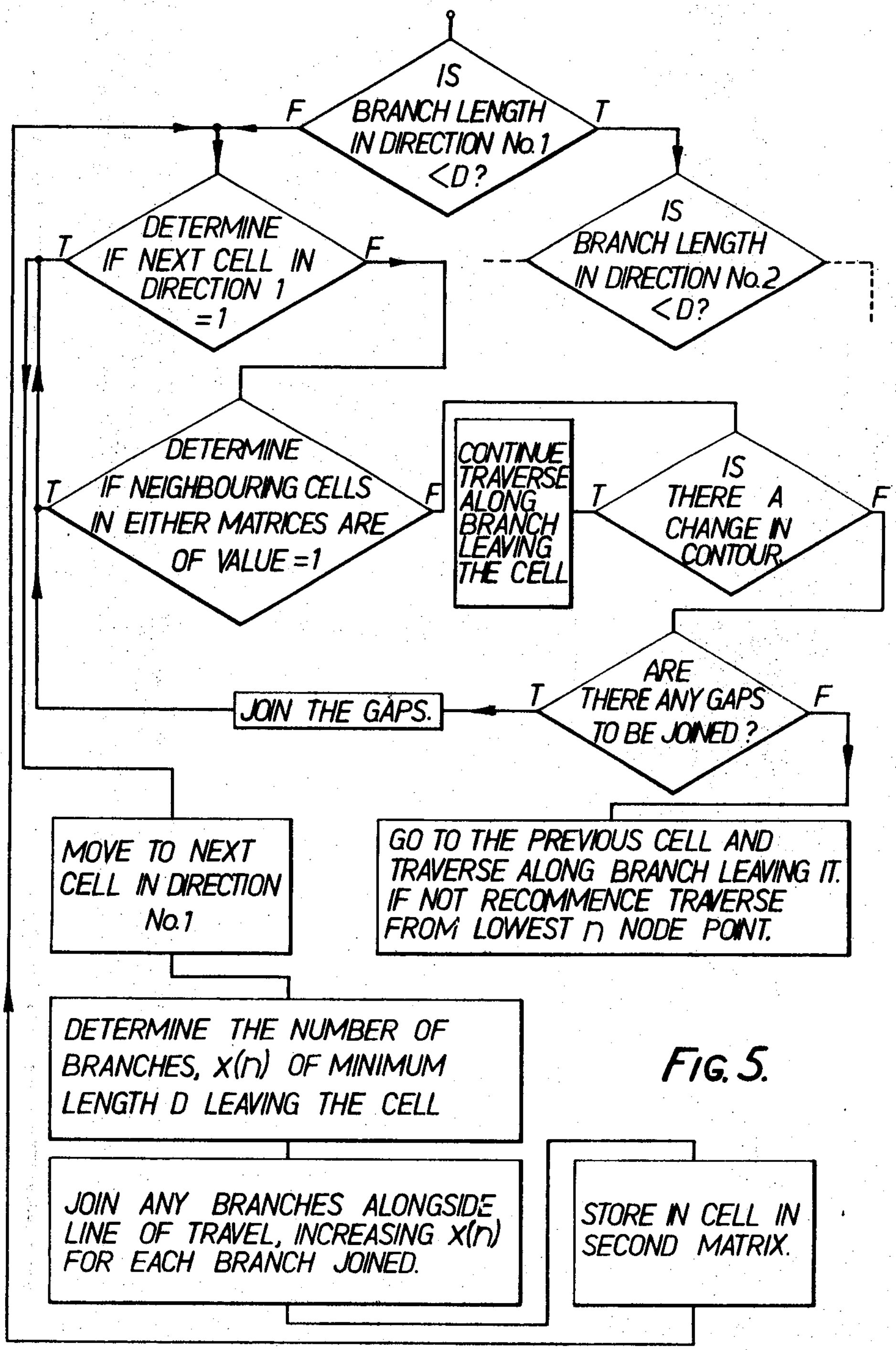
FIGS. 5 and 6 are computer instruction flow diagrams.
Figure 6:
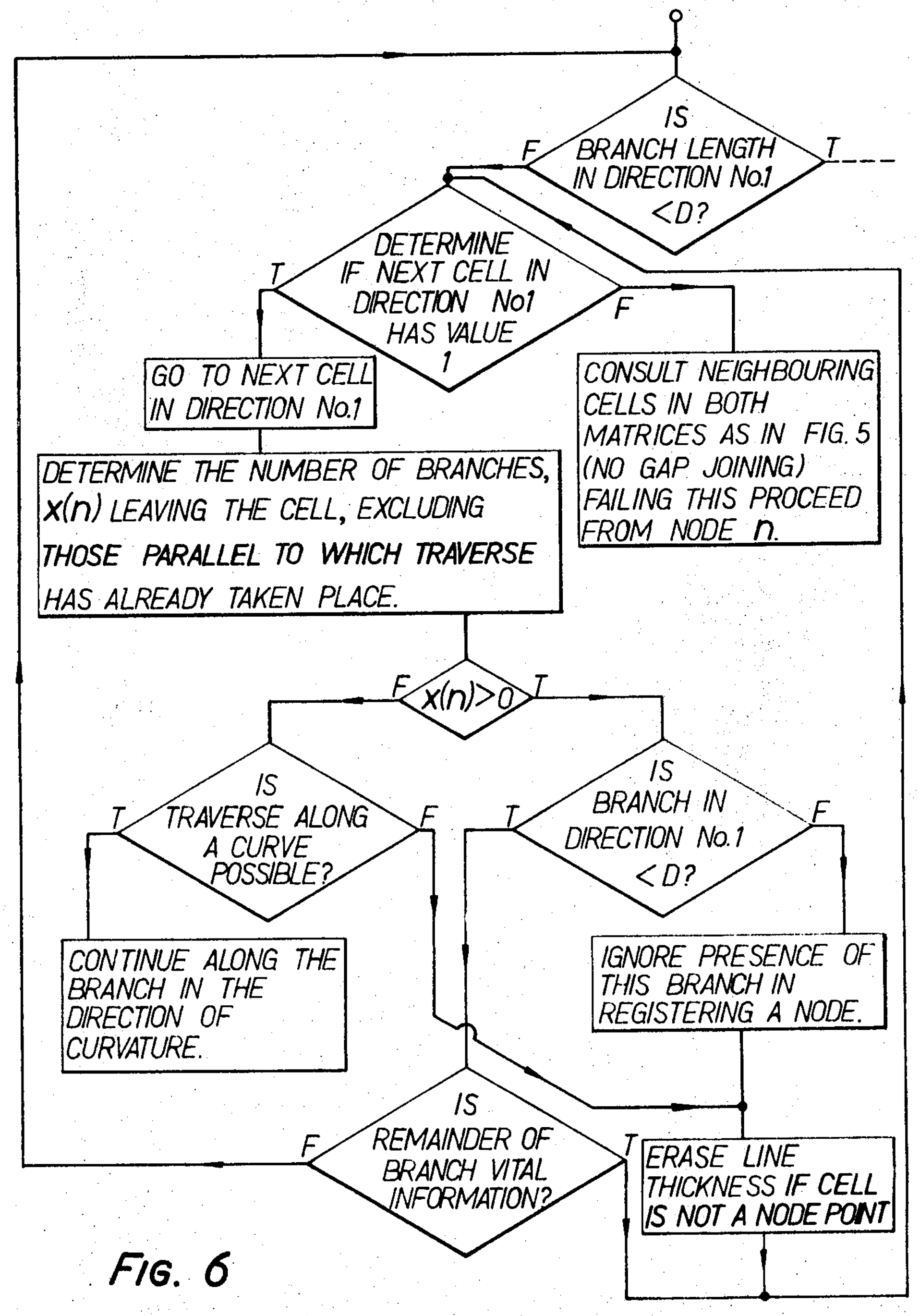

The smoothed input character 4, Fig. 4, can be processed further. The thickness of the features and the presence of the serifs in no way contribute, now, to a better character presentation. The features are therefore thinned, and serifs as well as other redundancies are eliminated. The results of "thinning" are shown in the letter indicated at 5. The letter has been reduced to minimum thickness and to a basic form. Such techniques reduce considerably the amount of information to be coded. Fig. 4 also illustrates schematically the coding step 6 and the recognition step 7. Fig. 6 shows the computer flow diagram of this reprocessing.

The residue in the first matrix is no longer needed and is therefore eliminated. To effect "thinning" the contents of the second matrix are transferred to the first matrix. The $x(n)$, and $(i, )$ $(n)$ values are put to zero. The computer then starts to examine each cell moving from top left within the search area and to the right but not beyond the midpoint of the width of the rectangular constraint. This arrangement ensures that the coded starting point is within a predetermined area and thereby facilitates the recognition procedure.

The "locking " procedure of the thinning process differs from that described above in the smoothing process in that a better starting point can be selected. In obtaining the starting point by the new method, the computer hunts, within a 3×3 square of cells, around the cell and determines whether there is nearby a node point possessing a higher value of $x(n)$. Should this be so, the latter cell is considered as the starting point. In this way, projections and serifs do not contribute to the starting point and are hence ignored. Projections, serifs, etc. at points other than the starting point are eliminated by the existence of the discontinuity at the end of the projection, etc. and by reference to the parameter D.

The character is examined cell-by-cell and cells of branches forming line thickness are erased except at junction points, where such erasure could lead to loss of information. Again, erasure of storage in the cells of the first matrix along the line of traverse, and their transfer to the second matrix, take place. The method of determining the junction points is as before. The node characteristics $n$, $x(n)$ and $(i, j)$ $(n)$ are stored but this time, together with variables indicating branch directions at the particular node. Before registering the existence of a branch in a particular direction at cell A$i, j$, the second matrix is consulted for the existence of an already traversed branch in the same direction or one or more parallel directions within the width of the character. In this way the program ensures that movement parallel to and forming the line thickness of a direction already traversed cannot take place.

The contents of the second matrix are then coded into a series of direction numbers which may include junction numbers and is then applied to recognition apparatus whose output may control other equipment to effect some operation in accordance with the identity of the recognized character.

The second matrix is subsequently cleared and the entire process can then be repeated for another character.

Figures 7, 8, 9:
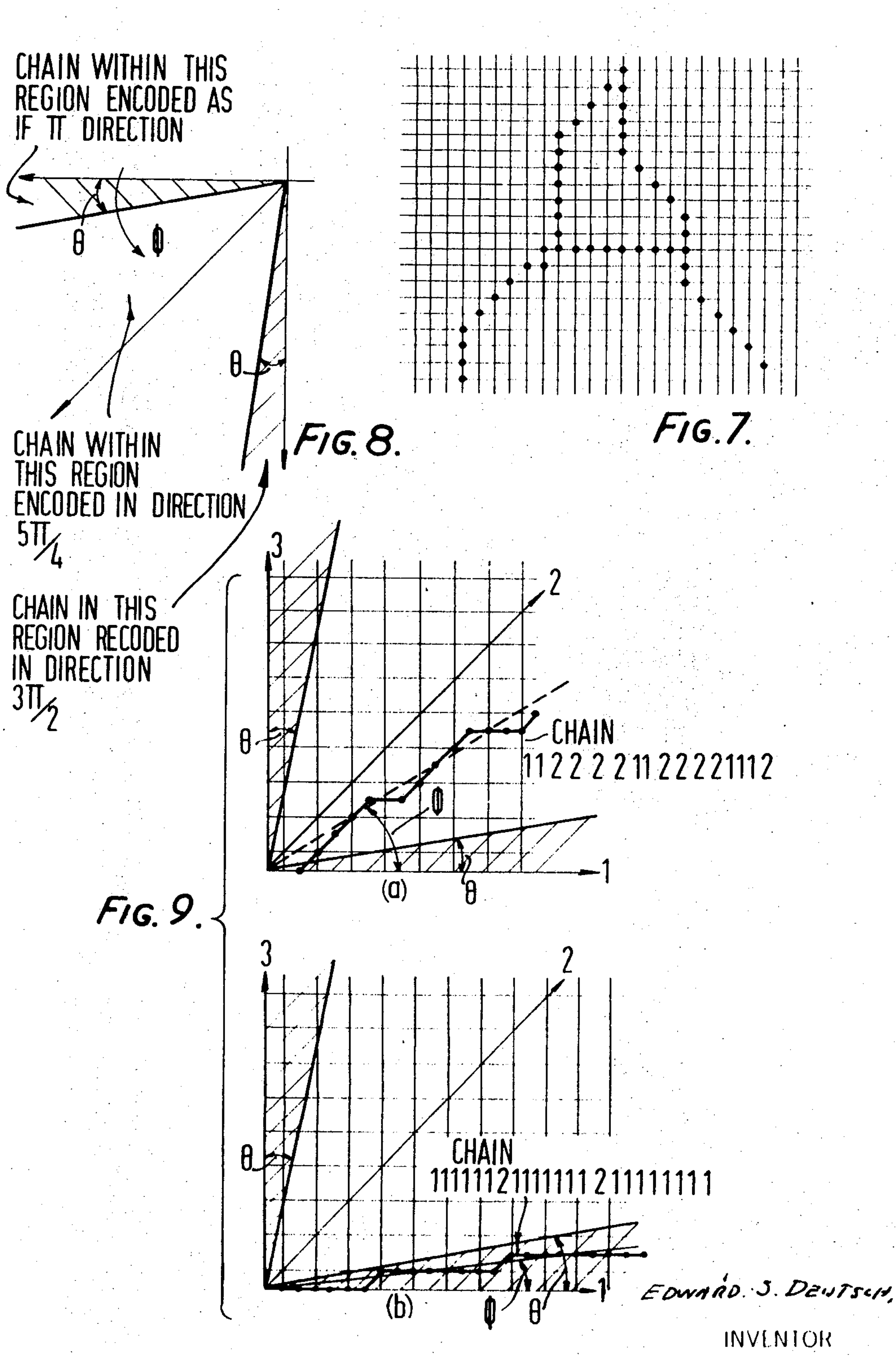
FIG. 7 shows a character after processing.
FIGS. 8; 9(*a*), (*b*); 10 and 11 are explanatory diagrams of recoding techniques.

The character having undergone all the preprocessing stages described above, can now be coded in the form of a string of numbers (indicating directions of traverse along points on the pattern) or vectors, and node points. Thus the character A shown in Fig. 7 is coded as:

J(1)66667777776J(2)66666777|J(1)7777788887J(3
)77788888|J(2) 1111111 J(3)*t*.
J(2)11111111|J(3)*t*.

Vertical bars are included in this chain to indicate the end of each feature of the character and the entry "*t*" at the end indicates the termination of the character chain. Coding starts from the top and leftmost point on the character matrix and follows a predetermined order of traverse direction which, in the present example, is 1, 8, 2, 3, 4, 5, 6 and 7.

The chain can have any number of elements in it, and the storage of different chains may become a problem if large scale storage is required. In addition, the more elements in a chain the longer any recognition process takes. It is therefore proposed to recode the chain so as to reduce the number of elements therein. The method of chain reduction will now be described in detail with the character A as an example.

Consider the first feature chain:

J(1)66667777776J(2)66666777.

The general feature direction $\underrightarrow{\text{is a}}$ slanted line, bearing in the direction of $\pi/4$ to horizontal $(\overline{\text{SW}})$, or $5\pi/4$. By counting the number of consecutive element value 6 and 7, ignoring node entries, the angular direction $\Phi$, of the feature can easily be determined. The angle $\Phi$ is then compared to a predetermined angle, $\theta$, and the whole feature recoded in accordance with the following conditions:

1. for $(3/2)\pi-\theta>\Phi>\pi+\theta$ recode chain in direction $5\pi/4$,
2. for $\pi+\theta>\Phi>\pi$ recode chain in direction $\pi$,
3. for $(3/2)\pi>\Phi>(3/2)\pi-\theta$ recode chain in direction $(3/2)\pi$.

Fig. 8 illustrates the three possible forms of recoding for a chain falling in the third quadrant. The actual method of recoding will be dealt with later. It should be noted that the same recoding would have taken place had the order of the groups of consecutive elements been interchanged. The general case is now considered, the angle $\theta$ being of the value $\pi/18$.

The ensuing description is concerned only with feature chains whose groups of consecutive identical elements, henceforth referred to as subchains are at $\pi/4$ to each other, i.e. subchains of the following form will be considered:

111122211....

118881111888....

6667776666777....

or more generally $e_ie_ie_ie_ie_{i+\pi/4}e_{i+\pi/4}e_{i+\pi/4}\ldots e_ie$ or $e_ie_ie_ie_ie_{i-\pi/4}e_{i-\pi/4}e_{i-\pi/4}\ldots e_ie_i\ldots$.

where $e_i$ is the element vector in direction $i(i=1\ldots.8)$ and $e_{i\pm\pi/4}$ is the element vector in the direction $i\pm\pi/4$.

It appears at first sight that there are 16 possible combinations of subchains, because every subchain in a given direction, $i$, can have one of two other subchains, either of elements $e_{i+\pi/4}$ or $e_{i-\pi/4}$, following it. Since a subchain of elements $e_{i+\pi/4}$ can be followed by a subchain of elements $e_i$ (or $e_{i+\pi/2}$), and, since both subchain combinations $e_i\, e_i\ldots.\, e_{i+\pi/4}e_{i+\pi/2}$ and $e_{i+\pi/4}e_{i+\pi/4}\ldots\, e_ie_i\ldots$ give the same feature orientation (provided of course that the number of $e_i$ elements in both subchain combinations are equal as must be the case for the $e_{i+\pi/4}$ elements), the order of subchains is interchangeable and there are therefore only eight possible different combinations of subchains. By way of example, a subchain comprising consecutive elements of vector value 3 will be considered. This subchain could be followed by a subchain of element vectors value 2 and 4. Consider next a subchain comprising vectors of value 2. It could be followed by subchain vector value 1 or 3. It will be seen that as the order of the subchains is immaterial, only three (1 and 3, 3 and 2, 3 and 4) subchain combinations of the four subchain combinations are different. Considering all the 16 possibilities of subchain combinations only eight of them will be seen to be different. Fig. 17 gives the final eight subchain combinations while Fig. 18 gives all 16 possible combinations and indicates those that are interchangeable.

The next part of the recoding process consists, as was stated above, of comparing the angular orientation, $\Phi$, of the feature chain with some predetermined angle $\theta$. If the inclination, $\Phi$, with respect to both horizontal and vertical axes is greater than $\theta$, the feature chain is recoded so that its new direction is either $\pi/4$, $3\pi/4$, $5\pi/4$or $7\pi/4$, depending, obviously, into which quadrant the feature chain extends. If, however, $\Phi$ is less than $\theta$ the branch is recoded so as to have an angular disposition of either 0, $\pi/2$, $\pi$, $3\pi/2$, again the choice depending upon how close the branch falls to either the positive or negative $x$ or $y$ axis.

As an example consider the feature chain:

112222112222111112 shown in FIG. 9($a$).

The general orientation $\Phi$ of the feature chain is greater than $\theta$ ($\theta=\pi/18$) and the chain would consequently be recoded, as if it was in direction $\pi/4$ or in vector direction number 2. Chain:

1111112111111112111111111... shown in FIG. 9($b$), for which $\Phi$ is less than $\theta$, recoding would yield a branch in direction number 1.

It should be noted, that all eight possible subchain combinations comprise a subchain of even valued elements followed by a subchain of odd-valued elements or vice versa. Transformation into direction 0, $\pi/2$, $\pi$ or $3\pi/2$, involves, as the case may be, the replacement of each element in the even valued subchain by the value of the odd elements in the subsequent subchain, and the reverse for transformations into directions $\pi/4$, $3\pi/4$, $5\pi/4$ and $7\pi/4$. Thus the chain:

1122221122221112 for which $\Phi$ is greater than $\theta$, all odd-valued elements in the subchains are to be replaced by the value of the even elements yielding a new chain:

2222222222222222 shown in FIG. 9($a$), and the chain 111111211111111211111111 is recoded to 111111111111111111111111.

Note the change in branch size.

Figure 10:
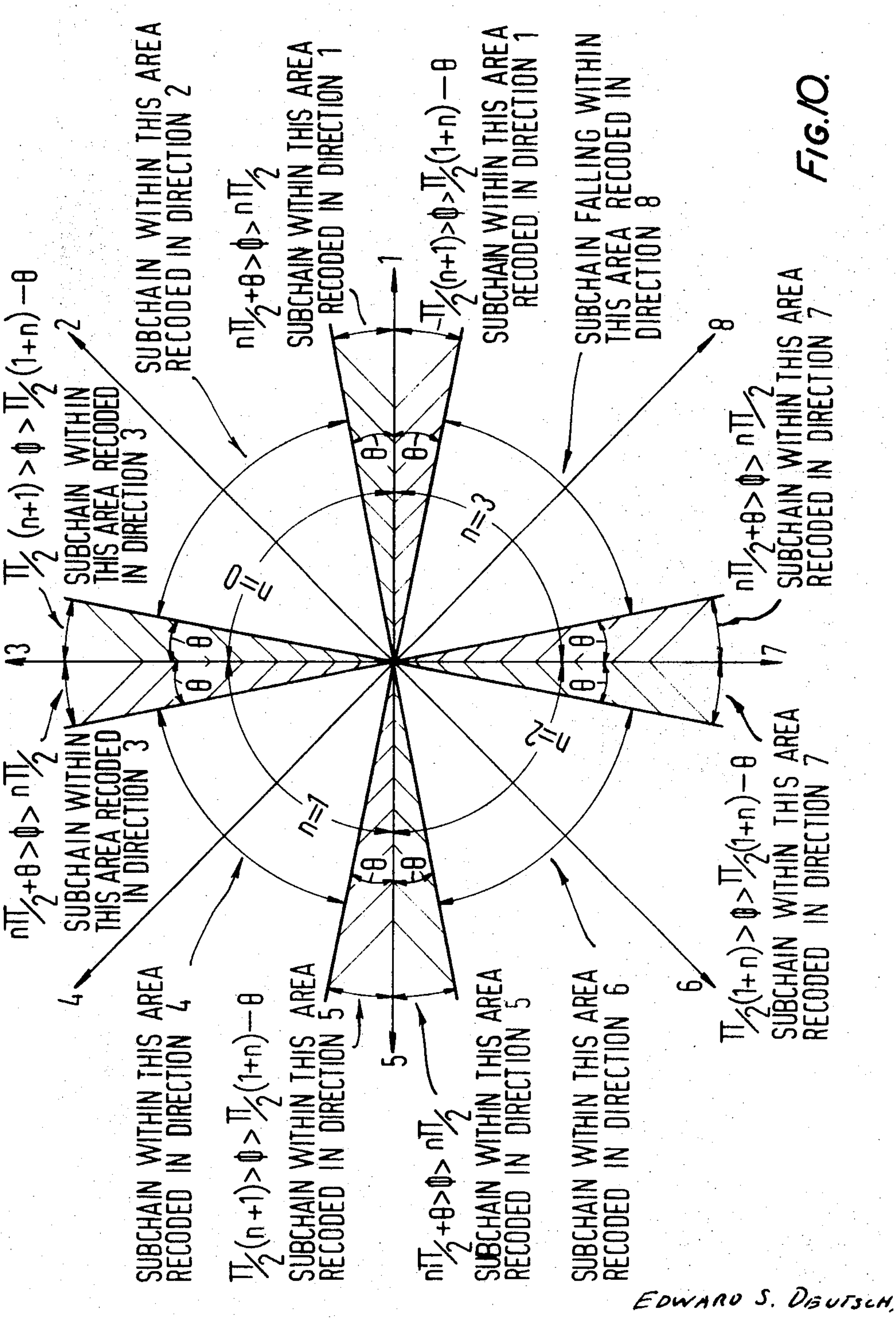

FIGS. 10 and 19 summarize the possible recoding directions. Referring to FIG. 19, it should be noted that for each subchain combination, there are only two entries for the final recoding or reorientation directions. This is to be expected, because each allowable subchain combination can only give an angular orientation variation of $\pi/4$, irrespective of the size of the individual subchains. For example, consider a subchain combination of elements 4 and 5. Any such combination must yield a feature in the third quadrant of an $x$, $y$ coordinate system, irrespective of the subchain size. Furthermore, the combination will yield a feature whose maximum possible value of $\Phi$ is $\pi$, this in the limit when the subchain size of elements value 4 is zero, and whose minimum possible value of $\Phi$ is 3 $\pi/4$, and this in the limit when the subchain length of elements value 5 is zero. Thus within the two limits shown, generally, below, $$\sum_{l_{e_i}\to 0}^{\lim} (l_{e_i}, l_{e_{i\pm\pi/4}}) \to \Sigma l_{e_{i\pm\pi/4}}$$

$$\sum_{l_{e_{i\pm\pi/4}}\to 0}^{\lim} (l_{e_i}, l_{e_{i\pm\pi/4}}) \to \Sigma l_{e_i}$$

where $l_{e_i}$ indicates the length, $l$, of a subchain having elements $e_i$ and the sigma denotes an assembly of subchains of length $l$ having elements $e_i$ or $e_{i\pm\pi/4}$ where $i=1..8$, it will be seen that the only possible recoding direction of the 4→5 element value subchain is in vector direction 5 or 4 corresponding to directions of maximum and minimum values of $\Phi$ respectively.

Accordingly the initial input character A (FIG. 7) is recoded as:

J(1)6666666666J(2)66666666J(1)888888888J(3)88888888J(2)AAAAAAAJ(3)$t$.

Figure 11:
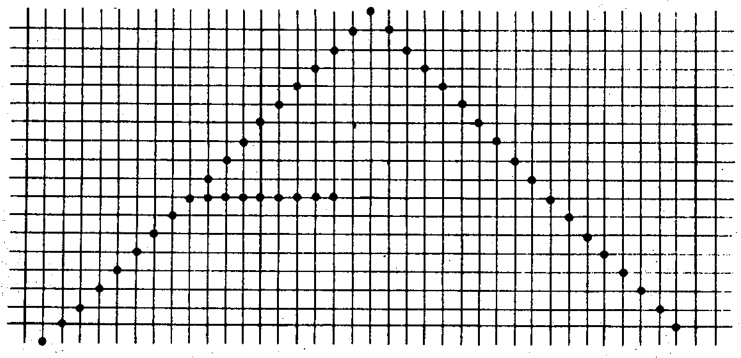

If now the input character shape were to be reconstructed, on the basis of the information content of the new, recoded chain, it will be slightly different in shape and various features will be altered in size. This can clearly be seen in FIG. 11. This is of no consequence as it is the feature orientation that is of interest. For this reason the recoded chain can be reduced still further. This involves the construction of a new chain, comprising only one element of a group of identical consecutive elements and the nodes, all in the previous order. Accordingly, the final chain code for the initial input is:

J(1)6J(2)6J(1)8J(3)8J(2)1J(3)$t$.

Generally, recoding of subchains in accordance with FIG. 9 only takes place if there is a minimum of three consecutive subchains, two of which are identical. It is hoped that recoding, by means of the stated subchain combinations alone, will be sufficient, in every case, so that the final chain will only present feature orientations and node points.

Using a character A as an example, the various recoding or transformation stages have been shown: starting from that of the first chain, through that of subchain transformation, and recoding, until finally that of feature direction coding only. Once coded in this form the input character is ready to be recognized. It is worth comparing the length of the original chain, started off with, with that of the chain finally developed. If the comparison be assessed on the basis of elements, including node points, in the chain, then in the present case there has been a reduction of 80 percent in the data to be handled for recognition purposes.

All the processes described hitherto may be considered as being transformations of the input pattern and as, therefore, many features are reduced to one and the same entry in the chain code, i.e. there is only a single feature description for numerous feature orientations and lengths, all the possible shapes of a transformed character can be predicted to a high degree of accuracy. There will be more than one transformation per class of character and particularly if hand printed characters are considered, but nevertheless it is thought that this number, by virtue of the rules of manipulation previously described, is strictly limited. In view of the final chain code size of the character A, and the limited number of transformations per character, storage of chain codes in a computer is not a great problem. It will be shown later that if there are say, *n*, possible chains per character, not all *n* chains have to be individually stored. Recognition can thus be effected by comparing the transformed input chain with those stored.

Figure 12:
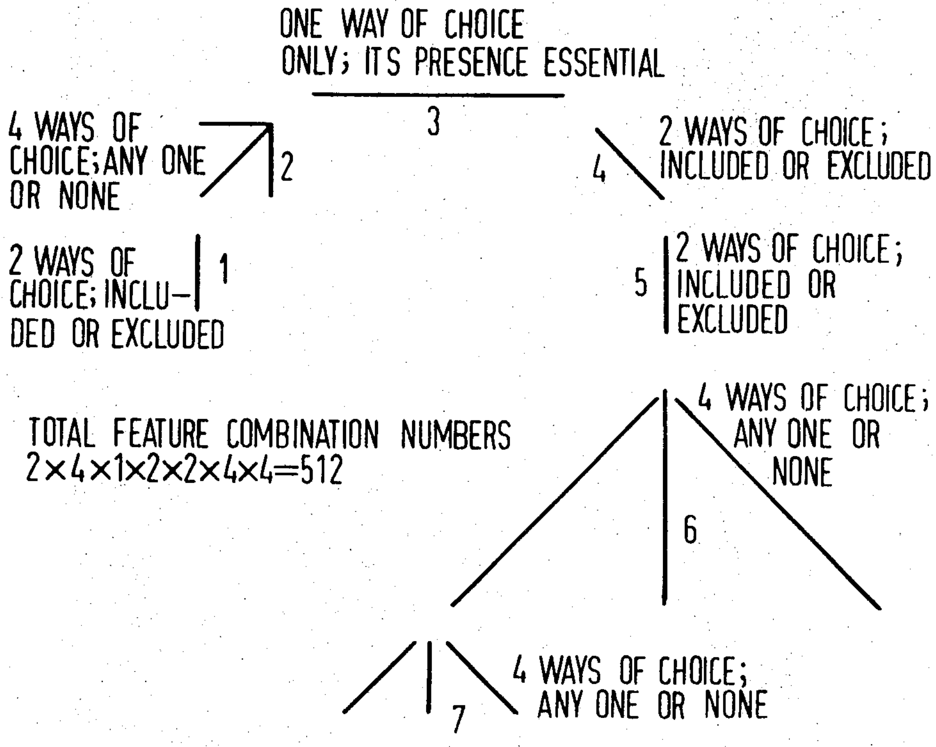
FIGS. 12 and 13 are explanatory diagrams of the basis of comparison techniques, FIGS 14(*a*), (*b*), (*c*); 15(*a*), (*b*), (*c*) and 16 are explanatory diagrams of the techniques of chain rotation, and, FIGS 17, 18 and 19 are explanatory tables.

This will now be illustrated with reference to character 7. FIG. 12 shows all the final possible feature directions of a transformed erect character 7. Not all the feature directions shown are found in every input 7.

Figure 13:
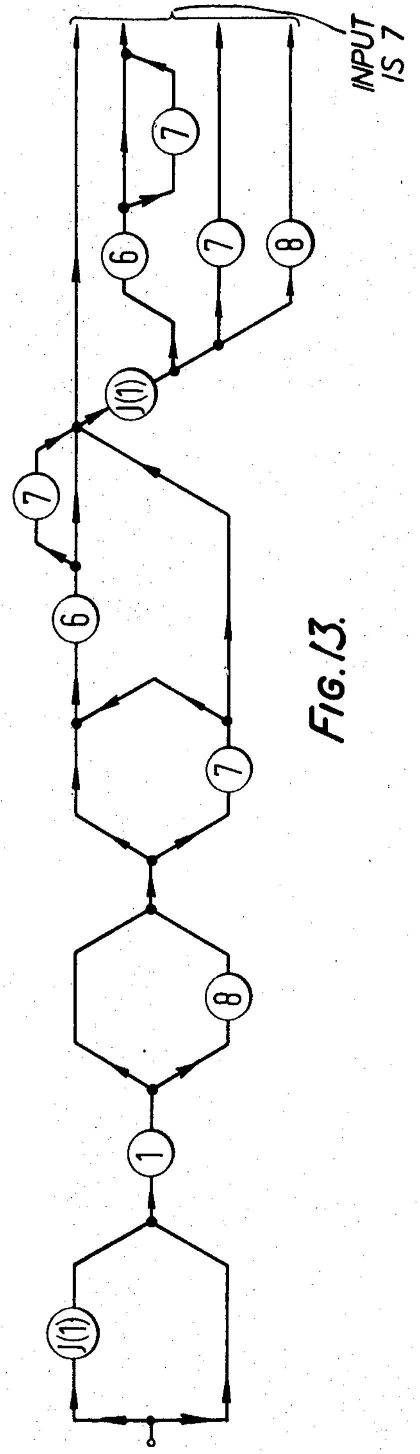

FIG. 12 also shows the number of ways a given feature direction can be coded, for example, feature number 2 can be coded in four different ways; either as a feature in direction 6, 7 or 8, or it need not be encoded at all if this feature is not present in the input 7. Feature number 3 can be coded in one way only (for an erect 7) as it must be present in every input 7. Multiplying all the possible ways of individual choice of features, it is found that the total number of combinations of features, (not all yielding a character 7), is 512. These 512 combinations do not have to be each stored separately. A simple flow diagram of the allowable combinations can be constructed. It is possible because some features are common to all combinations, by means of logic OR and AND operations to construct a simple computer routine that will include all the combinations. The feature combination flow diagram of the character 7 is given in FIG. 13, the encircled numbers representing feature direction.

The recognition of slanted, or rotated input patterns will now be dealt with. Handling these in the recognition stage involves the use of a further extension of the techniques discussed above. Consider the simple curve shown in FIG. 14(*a*). It will be finally coded as 87J(1)7J(1)1*t*.

Figure 14:
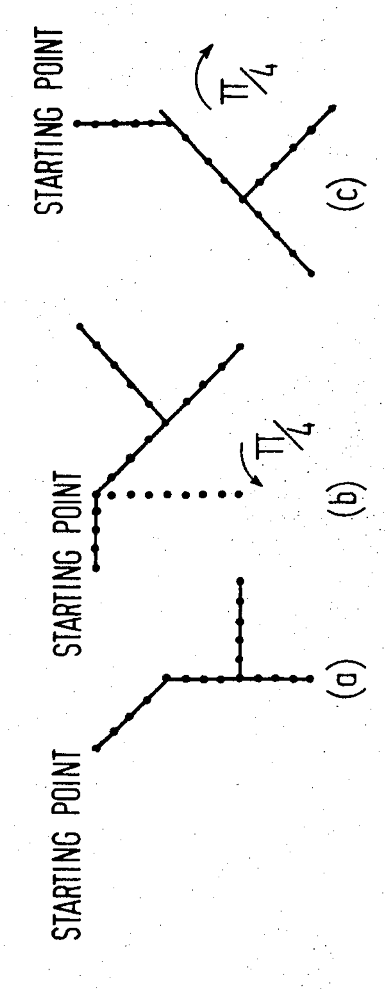

FIG. 14(*b*) depicts the same curve rotated by $\pi/4$ in an anticlockwise direction, and the rotated curve will be coded as 18J(1)8J(1)2*t*.

One is added to every vector element in the first chain in order to effect the rotation, and thus obtain the second chain. Similarly, by subtracting 1 from each element vector in the first chain, a rotation, of $\pi/4$ in a clockwise direction, of FIG. 14(*a*), is effected as shown in FIG. 14(*c*). This pattern will be encoded as 76J(1)6J(1)8*t*.

Note that the coding starting point is the same point on the curve in each case.

Figure 15:
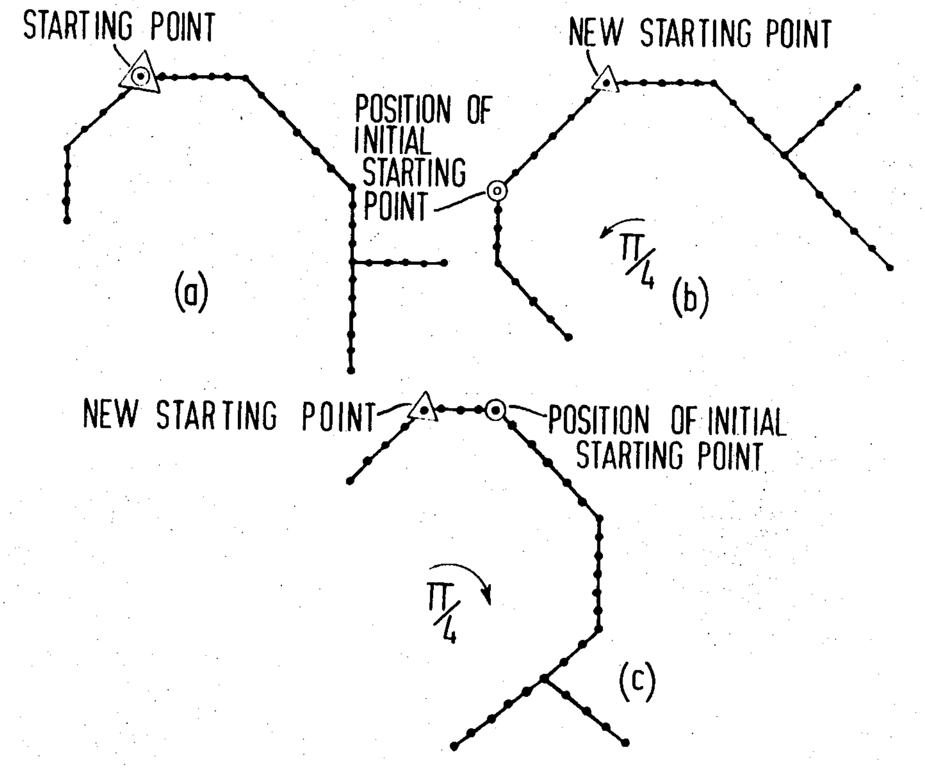

Next considered is the more complex chain shown in FIG. 15(*a*), concerning which the observation just made is inapplicable. With the coding starting point shown, being the top and leftmost point on the curve and the priority of encoding directions at the starting point being 1, 8, 2, 3, 4, 5, 6 and 7, the chain code of FIG. 15(*a*) is:

J(1)187J(2)7J(1)67J(2)1.

By priority of encoding the pattern is effectively encoded by traversing along it from the starting point in a clockwise direction. Hence the priority of movement in directions 1 and 8. In the absence of these direction 2 has priority (not 6) and so on.

Rotation of FIG. 15(*a*) by $\pi/4$ clockwise yields the curve shown in FIG. 15(*b*) which will be encoded (with the starting point at the top leftmost position) as:

J(1)18J(2)8J(1)678J(2)2.

This chain has been derived directly from FIG. 15(*b*) and not by application of the rotation rule to the chain of FIG. 15(*a*). The chain has been derived in this way is:

J(1)218J(2)8J(1)78J(2)2, and if the curve relating to this chain is drawn it will have its actual starting point displaced one element back in an anticlockwise direction, although the pattern will still be the same. A twofold chain-handling adjustment is required. Firstly the correct position of the starting point, within a derived chain, must be considered and secondly, consideration must be given to features which in a derived chain appear to have been rotated by 5*b*/4 relative to the starting point. For example, element value 1 following J(1) for the encoding of the feature in that direction in FIG. 15(*a*) has, on rotation by $\pi/4$ anticlockwise, been encoded as element value 6 (FIG. 15(*b*).

Now, it should be noted that in the rotated FIG. 15(*b*) the initial starting point (FIG. 15(*a*) has moved one feature along the pattern in a clockwise direction. Thus considering FIG. 15(*a*) and its chain code, and allowing the initial starting point to move one feature ahead, the vector element following the first entry J(1), may be considered to have been rotated by 4*Pb*/4 anticlockwise and thus has its value changed from 1 to 5. If this element is inserted in the chain immediately following the second entry J(1) there is obtained a chain code in the form J(1)87 J(2)7J(1)567J(2)1*t*.

Adding 1 to each element in the new chain to effect a $\pi/4$ anticlockwise rotation yields chain:

J(1)18J(2)8J(1) 678J(2)2*t* which is now identical to the chain obtained above from FIG. 15(*b*) directly.

Conversely when a rotation in a clockwise direction is to be effected, (see FIG. 15(*c*)) the starting point 'moves' one feature in reverse, in FIG. 15(*a*). Encoding the pattern in FIG. 15(*a*), with the starting point in the shifted position yields chain

J(1)2187J(2)7J(1)7J(2)1 and subtracting 1 to effect a $\pi/4$ clockwise rotation of the curve yields chain

J(1)1876J(2)6J(1)6J(2)8 which is the same code as would be derived from FIG. 15(*c*) directly. In effect, the element following the second encoding of J(1) may be considered to have been rotated by 4*b*/4 clockwise, changing its direction from 6 to 2, and then inserted in the chain immediately after the first entry J(1).

By starting off initially with the curve of FIG. 14(*b*), coded as:

18J(1)8J(1)2 it would not be possible to use the above techniques, directly, to derive its 'rotated' chain, since nowhere in the chain is a return made to the original starting point. In such a case an artificial junction point entry is made in the chain, J(0), and derivation is now possible. The above chain would accordingly be recoded as

J(0)18J(1)8J(0)J(1)2.

Clearly, now, there is a return to the starting point. Since there is no vector element in the chain following the second entry J(0), rotation by $\pi/4$ clockwise can be derived from the original chain directly. If the first element in the chain was an element vector in direction $\Phi$ where $(2\pi > \Phi \geq 3\pi/2)$, both clockwise and anticlockwise rotation chains could have been derived directly by adding or subtracting 1.

Also, if the new starting point was already entered as a junction point, i.e. $x(n) \geq 2$ the chain has to be rearranged again before making the above changes. The order of appearance of features has to be altered so that priority of feature encoding is still maintained, and the appropriate features have then to be rotated by $4 \times \pi/4$. Also the number of node entries has to be reduced by 1 because the new starting node and the original node at that point are now identical.

Figure 16:
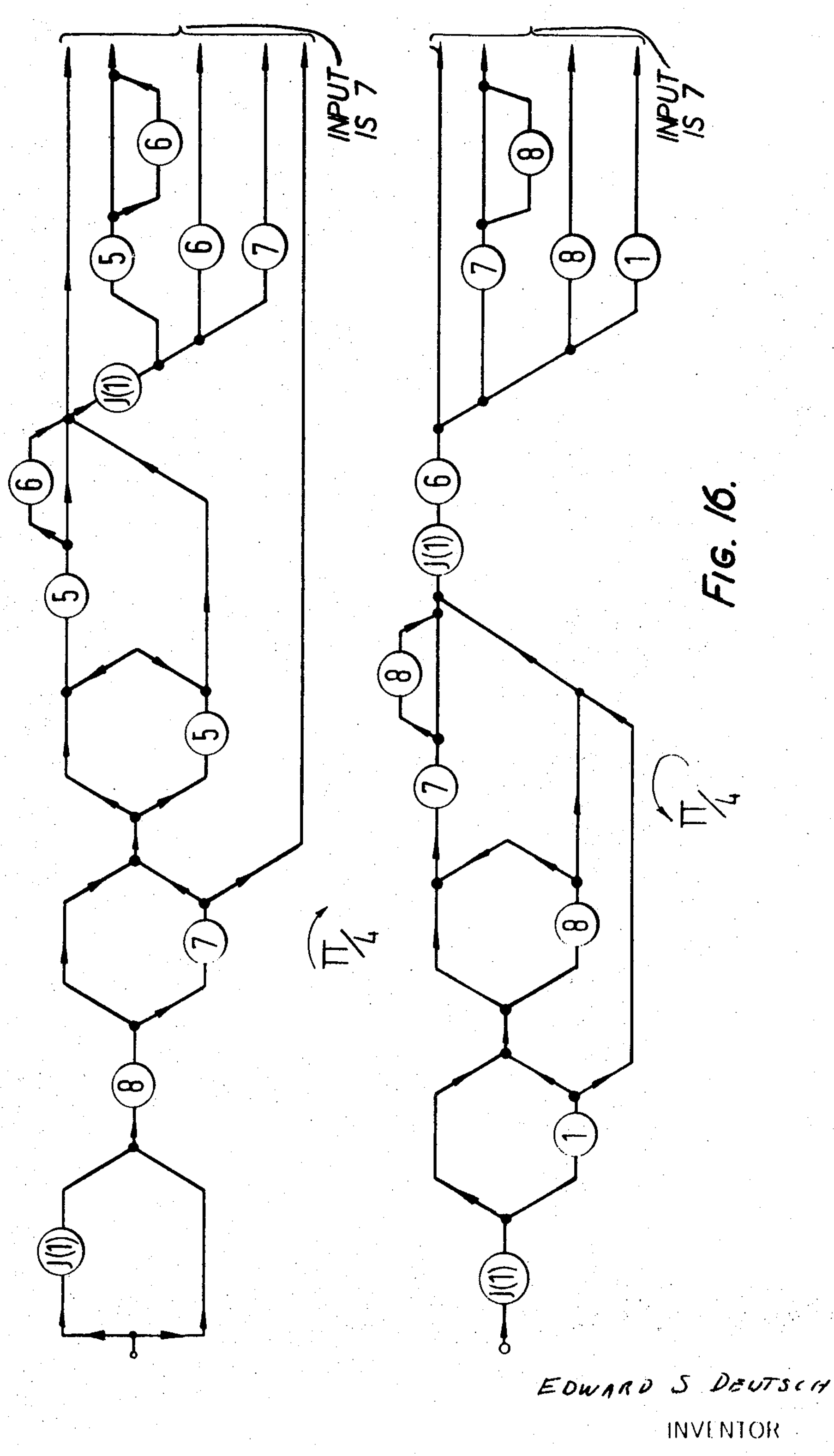

Accordingly a character can be rotated by $n\pi/4(n=0, 1, 2 \ldots)$ simply by moving the first starting point, $n$ elements along the chain but in the opposite sense to rotation, recoding the chain, and finally adding or subtracting $n$ from each element according to the rotation sense. This is in fact done to the feature-logic of character 7, see FIG. 16, and all the other stored chains of other characters. Care is taken to ensure that there are no ambiguities due to rotation, e.g. in FIG. 12 the left-hand feature of feature set 6 is not included in the clockwise rotation. In view of the simplicity of the technique, the speed of 'looking-up' the store is very fast.

Finally, it should be noted that in view of subchain combination recoding, on effecting a $\pi/4$ rotation either way about the vertical, the sector bounded by the limits of $\Phi$ where $\pi-\theta>\Phi>\theta$, is in fact included. By considering the possible subchain combinations that could yield the features shown in FIG. 12 in conjunction with FIG. 10, this is immediately apparent.

I claim:

1. A method of recognizing characters by linear traverse comprising the steps of:

a. storing electrical signals identifying the shape of the character in a first matrix of storage cells, b. processing the electrical signals stored in the first matrix to complete gaps and irregularities not inherent in the shape of the character, c. transferring the electrical signals identifying the shape of the completed character to another matrix of storage cells, d. examining the electrical signals stored in said other matrix to thin the shape of the character, e. transferring the electrical signals identifying the "thinned" character to a further matrix of storage cells, f. examining cell-by-cell the further matrix of storage cells starting from a predetermined one of the cells and examining in a predetermined numbered order of angular directions the condition of all cells immediately adjacent said one cell, g. identifying only those cells storing electrical signals which identify a part of the character of predetermined length emanating from said one cell, h. identifying said one cell as a junction point if more than two parts of said predetermined length emanate therefrom, i. continuing the examination of the cells along the part of the character, or along one of the parts if more than one exists, to the end of the part or to another junction point, j. returning the examination directly to a junction point and continuing the examination of the cells along another part of the character emanating from the junction point, k. repeating steps (i) and (j) until the cells along all parts of the character emanating from all junction points have been examined, l. expressing the results of the examination as a combination of the numbered angular directions and junction points to identify the character.

2. A method as claimed in claim 1 which includes the further steps of:

a. identifying those parts of the combination of numbered angular directions and junction points which define features of the character, b. establishing the mean angular direction of each such part of the combination, c. comparing the said mean angular direction with the numbered order of angular directions, d. recoding each said part as one of the numbered order of sequence directions if said mean angular direction lies within a given range of said one of the numbered order of sequence directions.

3. A process as claimed in claim 1 in which the step of identifying the character is performed by comparing the combination of numbered angular directions and junction points with each of a plurality of combinations each representing a possible variation of the character.